2 Sheets--Sheet 1.

S. W. MURRAY & B. P. LAMASON.

Railway Oil Cars.

No. 5,406. Reissued May 13, 1873.

Witnesses:
T. C. Drucht,
Albert H. Norris

Inventors:
S. W. Murray &
B. P. Lamason
by
James L. Norris,
Attorney.

2 Sheets--Sheet 2.

S. W. MURRAY & B. P. LAMASON.

Railway Oil Cars.

No. 5,406.

Reissued May 13, 1873.

Witnesses:

J. C. Brecht.

Albert H. Norris

Inventors:

S. W. Murray & B. P. Lamason,

By

James L. Norris.

Attorney.

UNITED STATES PATENT OFFICE.

SAMUEL W. MURRAY AND BENJAMIN P. LAMASON, OF MILTON, PA.

MPROVEMENT IN RAILWAY OIL-CARS.

Specification forming part of Letters Patent No. 106,058, dated February 22, 1870; reissue No. 5,406, dated May 13, 1873; application filed December 26, 1872.

*To all whom it may concern:*

Be it known that we, SAMUEL W. MURRAY and BENJAMIN P. LAMASON, of Milton, in the county of Northumberland and State of Pennsylvania, have invented certain new and useful Improvements in Railway Oil-Car; and we do hereby declare that the following is a full, clear, and exact description thereof, that will enable others skilled in the art to which it appertains to make and use the same, reference being had to the accompanying drawing and to the letters of reference marked thereon which form a part of this specification.

This invention relates to that class of railroad cars which are provided with liquid-tight tanks or bodies for the transportation of petroleum and other oils in bulk. The invention relates, primarily, to the construction of the car body or frame; and it consists in combining, with the longitudinal wooden beams or stringers and end sills thereof, lateral longitudinal metallic tubes supported by metallic brackets, and through which extend tie-rods secured to the end beams of the frame. The second feature of our invention consists in the provision of a railing or balustrade, surrounding the oil tank or reservoir, and composed of a hand-rail attached to posts which are secured to the brackets, supporting the metallic tubes of the frame. The third feature of our invention relates to a novel method of connecting the car-body to the running-gear; and it consists in the employment of a headless king-bolt provided with a collar resting upon the head-block, and with spindles resting on opposite sides thereof, which enter, respectively, the transom or head-block, said bolt being of such a form that a vertical movement or removal of the car-body is possible without detaching the bolt. The fourth feature of our invention relates to the method of securing the floor of the car to the lateral metallic tubes; and it consists in the employment of hooked bolts which embrace the tubes and extend through the car-floor for permitting the application of fastening-nuts. The fifth feature of our invention consists in applying to the man-hole cover of the oil-tank a packing-strip, which is inserted into a dovetailed groove formed in the lower surface of the same.

Figures 1, 6:
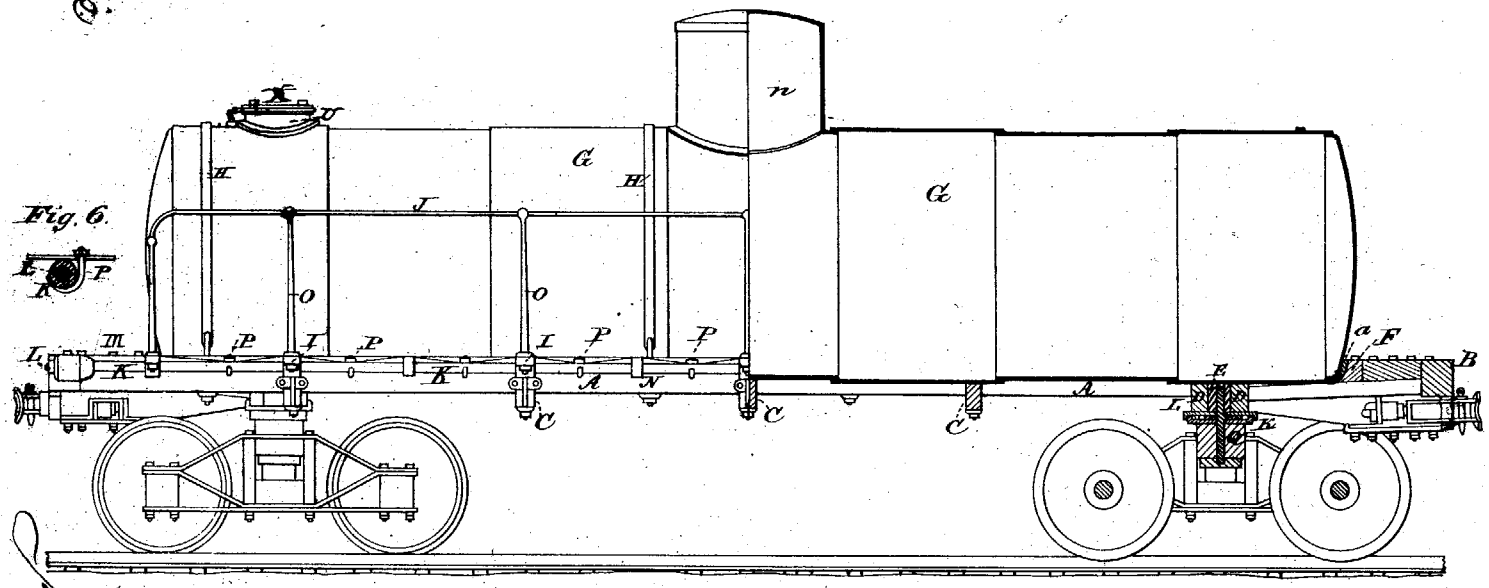
Figure 3:
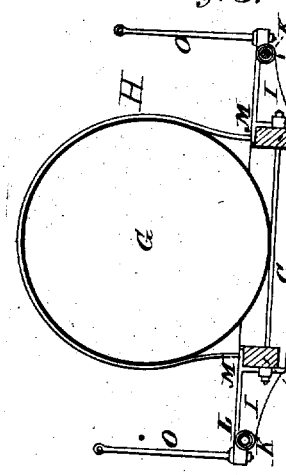
Figure 2:
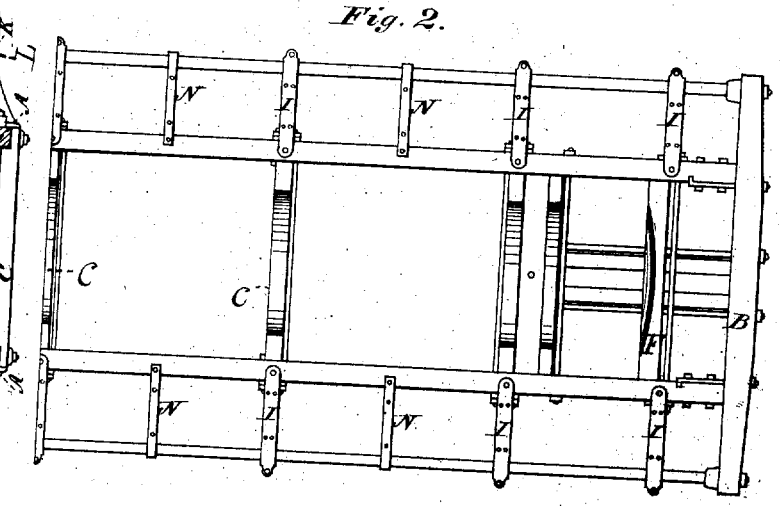
Figure 4:
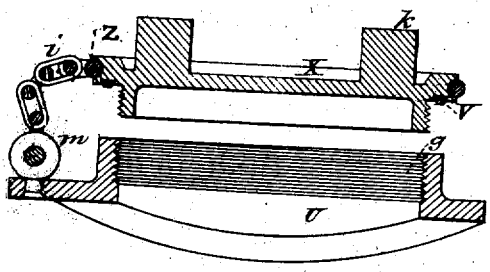
Figure 5:
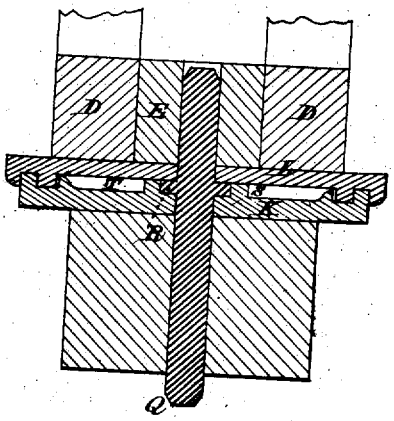

In the drawing, Figure 1 is a side elevation, showing one half of the car in a longitudinal section. Fig. 2 represents a plan view of one-half of the car-frame. Fig. 3 represents a transverse section of the same. Fig. 4 represents a detail sectional view of the man-hole and cover. Fig. 5 represents a sectional view of the body-bolster and king-bolt. Fig. 6 represents a detached view of one of the lateral frame-tubes and hooked bolt.

Like letters of reference indicate corresponding parts in the several figures.

The wooden stringers A, extending the entire length of the car, are framed into the end sills B, and the transverse beams C are correspondingly secured to the stringers A. The bolster or transom for receiving the devices serving to connect the car-body to the running-gear is composed of the beams D E D. The upper surfaces of the transverse beams are made concave so as to conform in shape with the tank G, which rests on or is supported by said beams. At the ends of the tank are located transverse beams F, the inner surfaces of which are cut away to form seats for the reception of the heads of the oil-tank. Between the tank-head and said seat is interposed an elastic packing material, *a*, of oakum, India rubber, or other suitable material, which is designed to prevent the longitudinal displacement of the tank and the injurious effects arising from the direct contact of the same with the wood if a slight movement of the tank should take place. The vertical movement of the tank is prevented by means of metallic straps H encompassing the tank and secured to the frame. From the sides of the car-body or stringers project a series of metallic brackets, I, secured to the stringers by flanges and bolts, and provided with openings for the passage of a longitudinal metallic tube, K, which is formed with washers at both ends, which bear against the inner sides of wooden end sills B. An iron tie-rod, L, passes through the tube and extends through the end sills for the purpose of applying to the screw-threaded ends of said rod screw-nuts, which, when tightened, will cause the car-frame to be drawn compactly together. Vertical posts O are secured to the brackets I by means of a screw-neck or other means, and the upper ends of said posts are formed with openings for the passage of a continuous hand-rail, J. A balustrade or safety-railing is thus formed around the car for preventing the occurrence of an accidental fall from the car. The metallic floor M at the sides and ends of the car is supported by the brackets I and supplementary brackets N attached and projecting from the stringers, and is secured to the same by rivets, and to the timbers composing the car-frame by screws and bolts. Hooked bolts P, embracing the lateral tubes K and projecting through the floor, serve, in connection with nuts applied to their upper ends, as additional means for firmly securing the floor in position. The car-body is connected to the running-gear by means of king-bolts Q of a novel construction, the same being formed with a collar, R, near the center of the bolt, and with headless or cylindrical portions. The collar R rests between the center or bearing plates S T, and the upper and lower ends of the bolt enter, respectively, the truck and body bolsters K E.

The employment of a king-bolt so constructed will obviate the necessity of passing the same down through the car-floor, forming an opening permitting the escape of liquids, grain, &c., as ordinarily practiced when using bolts provided with heads at their upper ends. A decided advantage is also offered by the fact that our car-body can be easily raised without necessitating the removal of the bolt.

The base of the man-hole cover U is made of metal, and is formed with an internal screw-thread, *g*, and smooth upper edge, and is secured to the tank so as to surround the hole forward in the same by means of rivets. The man-hole cover X has an outside diameter corresponding with inside diameter of base U, and is formed with an external screw-thread. A horizontal flange extends beyond the screw on the cover, and is provided on its under side with a dovetailed groove, into which is inserted a packing-strip, V, of lead or other suitable material, projecting slightly below the face of the flange. When the cover is screwed into the base by means of a lever placed between the projecting lugs *k* formed on the same, the projecting edge will come in contact with the face of the base U, and thus form a perfectly oil-tight joint. The cover X is attached to the base U by means of an iron ring, Z, inserted into the grooved periphery of the cover-flange, the ends of the ring being secured by a bolt to the chain *i*, and the whole firmly connected to the base U by means of the eyebolts *m*. The cylindrical oil-tank is generally constructed of boiler-iron firmly riveted together, and is provided, as shown at *n*, with an expansive dome.

Having thus described my invention, what I claim as new, and desire to secure by Letters Patent, is—

1. The combination, with the main frame of the car-body, of the brackets I, lateral tubes K, and the rods L, constructed and arranged substantially as and for the purpose set forth.

2. In combination with the brackets I, the posts O and hand-rail J, substantially as and for the purpose set forth.

3. In combination with the flanged center plates L K of the body of the car and the bolster of the truck, the king-bolt Q having a collar, R, substantially as described, for the object specified.

4. The combination, with the lateral tubes K and floor M, of the hooked bolts P, as and for the purpose set forth.

5. The man-hole cover X of a railroad oil-car, having a dovetailed groove for the reception of a packing-strip, V, as set forth.

In testimony that we claim the foregoing we have hereunto set our hands.

SAMUEL W. MURRAY.
BENJ. P. LAMASON.

Witnesses:
WM. M. MERVINE,
JAS. M. BELFORD.